UNITED STATES PATENT OFFICE.

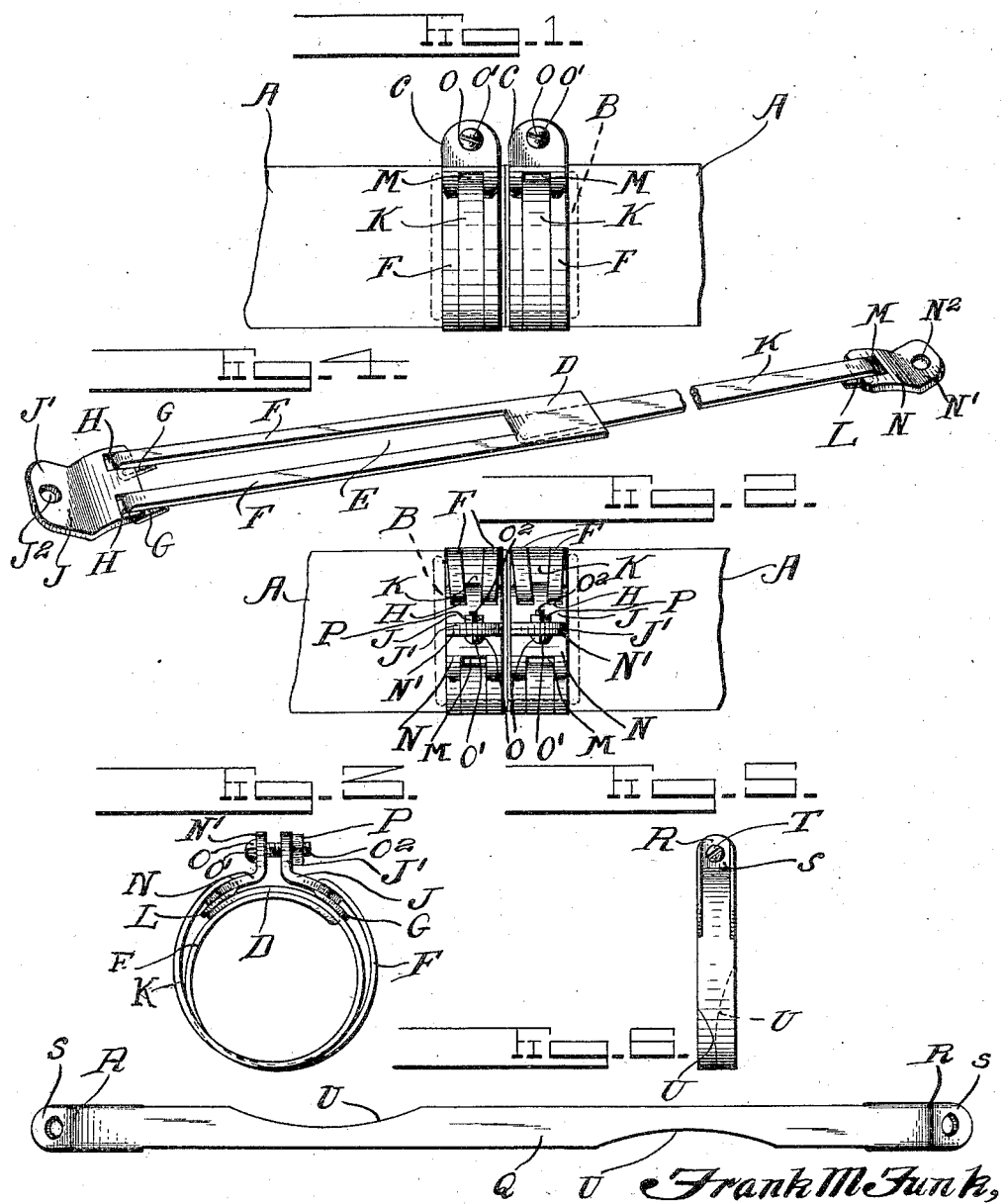

FRANK M. FUNK, OF DETROIT, MICHIGAN.

HOSE COUPLING OR CLAMP.

1,182,161. Specification of Letters Patent. Patented May 9, 1916.

Application filed November 5, 1913. Serial No. 799,286.

*To all whom it may concern:*

Be it known that I, FRANK M. FUNK, a citizen of the United States, residing at Detroit, in the county of Wayne and State of Michigan, have invented certain new and useful Improvements in Hose Couplings or Clamps, of which the following is a specification.

My invention relates to improvements in hose couplings or clamps, the object being the provision of a device of this character capable of use in connecting either the meeting ends of hose, or for connecting the hose to the service pipe connection or to the nozzle, as desired, and which will be thoroughly efficient in performing its intended functions.

Another object of my invention is the provision of a coupling which can be instantly applied and adjusted to make a positive and reliable coupling, and which can be easily removed when found necessary.

Another object of my invention is the provision of a coupling capable of use upon any character of flexible hose or pipe, which will be of the most simple, durable and inexpensive construction, and which will be entirely practical from every point of view.

With these objects in view, my invention consists of a hose coupling embodying novel features of construction and combination of parts, substantially as shown, described and claimed.

In order that the detailed construction and the operation of my coupling may be fully understood and its features of merit and advantages be appreciated, I have illustrated in the accompanying drawing a hose coupling embodying my invention.

Figure 1 represents a side elevation of my coupling in position upon the meeting ends of the hose, and Fig. 2 represents a top plan view thereof. Fig. 3 represents an end or edge view of the coupling detached, and Fig. 4 represents a perspective view of the coupling as it appears before application to the hose. Fig. 5 represents a side view, and Fig. 6 represents a plan view of a modified form of my hose coupling.

It will be understood that the coupling may be used for connecting the meeting ends of hose, for connecting the nozzle with the hose, or for coupling the hose with the service pipe connection; but for purpose of illustration the coupling is shown as applied to the meeting ends of the hose, and in the drawings, the letter A, designates the ends of the hose, B designates a sleeve disposed in the ends of the hose, and C designates the couplings for binding or connecting the ends of the hose upon said sleeve B.

The form of my coupling shown in Figs. 1, 2, 3 and 4, consists of the plate or strap D, made of flexible material and having its body portion cut out or slotted at E, to provide the pair of parallel arms F formed at their free ends with the hooks G, to engage the openings H in the plate J, having the vertical wall J', formed with an opening $J^2$, and the material cut out from the plate to provide the slot E forming the arm or strip K, formed at its free end with a hook L, to engage the opening M, of the curved plate N, whose vertical wall N' is formed with an opening $N^2$. From this construction, it will be observed that the coupling comprises a plate having on one side a pair of strips or arms, and on the other side a single arm or strip, which double and single strips pass around the ends of the hose and have the curved plates bear upon the hose and in the openings of the vertical walls of said plates are mounted the binding or clamping screws O, which have their slotted ends or heads O' adapted to receive a screw driver to cause their threaded ends $O^2$ to engage the nuts P, which cause the embracing strips or arms to tightly bind or clamp the ends of the hose upon the coupling sleeve, nozzle, service connection or in fact upon any place where the coupling would prove useful and efficient.

In the form of my invention shown in Figs. 5 and 6, the function and operation are the same, but the construction is somewhat different, this form of the coupling comprising an embracing strap Q, carrying at each end a perforated lug R, formed with vertical flanges S, the openings receiving a clamping screw T, and the body of the strap being formed on opposite sides with recesses U, which permits the strap to fit around the pipe or hose after the manner of a single strip of the same width. This form of the coupling is more simple and less expensive than the other form, and in many cases would prove more useful and desirable.

From the foregoing description, taken in connection with the accompanying drawing, the many advantages of my device will be readily understood, and it will be at once apparent that the coupling can be instantly applied and adjusted, and will provide a water-tight joint; also that the coupling can be as easily removed and can be used for various characters of service.

I claim:

A hose clamp comprising an integral strip provided with a central portion having two arms extending in one direction therefrom and an arm struck from the blank and extending in the opposite direction, each arm terminating in a hook, two plates having each a plane portion to receive a clamping screw and a curved portion to fit upon the hose, said plates having openings in their curved portions receiving the said hooks.

In testimony whereof I affix my signature in presence of two witnesses.

FRANK M. FUNK.

Witnesses:
I. N. POTTER,
H. J. JONES.

Copies of this patent may be obtained for five cents each, by addressing the "Commissioner of Patents, Washington, D. C."